United States Patent
Hao et al.

(10) Patent No.: US 7,961,731 B2
(45) Date of Patent: Jun. 14, 2011

(54) METHOD AND SYSTEM FOR REAL-TIME DETECTION OF HIDDEN TRAFFIC PATTERNS

(75) Inventors: Fang Hao, Morganville, NJ (US); Muralidharan Sampath Kodialam, Marlboro, NJ (US); Tirunell V. Lakshman, Morganville, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 759 days.

(21) Appl. No.: 11/096,220

(22) Filed: Mar. 31, 2005

(65) Prior Publication Data

US 2006/0221855 A1    Oct. 5, 2006

(51) Int. Cl.
*H04L 12/28* (2006.01)
*G01R 31/08* (2006.01)
*H04J 3/24* (2006.01)
*G06F 15/173* (2006.01)

(52) U.S. Cl. .................. 370/392; 370/252; 370/395.32; 370/474; 709/224

(58) Field of Classification Search .................. 370/229, 370/230, 310, 351, 379, 382, 389, 392, 393, 370/395.3–395.32, 471, 474, 464–465, 477, 370/252; 709/220–224
See application file for complete search history.

(56) References Cited

U.S. PATENT DOCUMENTS

| | | | |
|---|---|---|---|
| 6,449,256 B1 * | 9/2002 | Varghese et al. | 370/238 |
| 6,947,931 B1 * | 9/2005 | Bass et al. | 707/6 |
| 2003/0161310 A1 * | 8/2003 | Dobbins et al. | 370/392 |
| 2003/0217175 A1 * | 11/2003 | Mathew et al. | 709/238 |
| 2005/0060428 A1 * | 3/2005 | Corl et al. | 709/240 |

OTHER PUBLICATIONS

"Runs bAsed Traffic Estimator (RATE): A Simple, Memory Effecient Scheme for Per-Flow Rate Estimation", Kodialam, M. Lakshman, T.V, Mohanty, S.; IEEE INFOCOM 2004, vol. 3, p. 1808-18, ISBN: 0780383559, Mar. 7-11, 2004.*
C. Estan and G. Varghese. "New Directions in Traffic Measurement and Accounting", SIGCOMM'02, Pittsburgh, PA, Aug. 19-23, 2002, pp. 323-336.
C. Estan, et al., "Automatically Inferring Patterns of Resource Consumption in Network Traffic", SIGCOMM'03, Aug. 25-29, 2003, Karlsruhe, Germany, pp. 137-148.
M. Kodialam et al, "Runs bAsed Traffic Estimator (RATE): A Simple, Memory Efficient Scheme for Per-Flow Rate Estimation", IEEE INFOCOM 2004.

* cited by examiner

*Primary Examiner* — Aung S Moe
*Assistant Examiner* — Redentor Pasia
(74) *Attorney, Agent, or Firm* — Wall & Tong, LLP

(57) ABSTRACT

A method for measuring flow is disclosed. The method includes receiving an IP packet; determining if another IP packet is stored in a register; if another IP packet is stored in the register, comparing the stored IP packet with the received IP packet; and determining the longest match between the stored IP packet and the received IP packet.

20 Claims, 3 Drawing Sheets

200

| srcIP, srcPort, dstIP, dstPort, prot | Count |
|---|---|
| X, X, X, X, 6 | 1 |
| X, X, X, X, 17 | 2 |
| X, X, X, 8000, X | 1 |
| X, X, X, 8000, 17 | 10 |
| X, X, X, 80, 6 | 5 |
| X, 80, X, X, X | 0 |
| X, 1148, X, X, X | 15 |

FIG. 2

METHOD AND SYSTEM FOR REAL-TIME DETECTION OF HIDDEN TRAFFIC PATTERNS

FIELD OF THE INVENTION

Embodiments of the present invention are directed to data network management and, in particular, to methods and systems for detecting and identifying traffic patterns and flow, traffic management, and network security in IP/MPLS networks.

BACKGROUND OF THE INVENTION

Accurate and fast flow measurement and characterization of a data network is an important component for network management, accounting and traffic engineering. For instance, network service providers may be interested in which flows from which customers consume most of their network resources during any given time period, and adjust their provisioning and pricing accordingly. Network operators may need to continuously monitor the traffic patterns of their network traffic to detect any suspicious changes in such traffic patterns. A sudden increase in traffic to a particular destination, for example, may indicate a possible Denial of Service (DoS) attack.

Known methods of flow measurement and packet sampling have attempted to solve the above-mentioned network monitoring issues. The proposed mechanisms typically use an explicit definition of flow. A common definition is to characterize a flow by a 5-tuple in the IP packet header, including source IP (src IP) address, source port (src Port), destination IP (dst IP) address, destination port (dst Port), and protocol ID (prot).

However, knowing what type of flow to capture or measure before actually conducting measurements is often very difficult, if not impossible. Any combination of fields in the 5-tuple of the IP packet may constitute a flow with an "interesting" traffic pattern, but this combination is not known a priori. In this sense, interesting traffic patterns are often hidden in traffic streams and efficient algorithms to uncover them in real-time are heretofore unknown.

As an example, an "interesting" flow for observation may not be the 5-tuple flow, but the flows defined by only certain sub-fields, such as destination address and port number, for example. Network operators often do not know what flows to look for until they actually observe statistics on various kinds of flows. Furthermore, measuring one particular type of flow may either lose or hide important information that can be derived by measuring other types of flows.

For example, measuring only detailed 5-tuple flows may not reveal a possible ongoing DoS attack, because such attack may consist of not one but many small 5-tuple flows. Similarly, measuring only aggregated flows based on sub-fields like destination address and port number, for example, may not reveal which source network uses most of the network bandwidth.

Another known system uses a traffic measurement algorithm that does not require a priori flow definition. Instead, this system sifts through traffic trace data and generates reports for multi-dimensional traffic clusters. The approach can capture any flow with a rate above a predefined threshold, regardless of flow dimensionality. Although this improves usability and convenience for network operators, this approach requires scanning of the trace multiple times and is essentially designed for off-line processing. The processing complexity and memory usage are not optimized for fast on-line measurement.

Thus, there is a need for a practical and real-time, on-line traffic or flow measurement approach that does not require a priori knowledge of flow definition.

SUMMARY

Various deficiencies of the prior art are addressed by embodiments of the present invention of a method and system for real-time detection of hidden traffic patterns.

In accordance with an embodiment of the present invention, there is provided a method for measuring flow, comprising receiving an IP packet; determining if another IP packet is stored in a register; if another IP packet is stored in the register, comparing the stored IP packet with the received IP packet; and determining the longest match between the stored IP packet and the received IP packet.

In accordance with another embodiment of the present invention, there is provided a computer readable medium having stored thereon instructions that, when executed by a processor, cause the processor to perform a method for determining a flow measurement, comprising receiving IP packets; determining if IP packets exist in memory; if other IP packets exists, comparing respective existing IP packets and received IP packets; and determining the longest match to identify thereby a flow measurement.

In accordance with yet another embodiment of the present invention, there is provided a system for measuring flow, comprising means for receiving IP packets; means for determining if IP packets are stored in memory; if IP packets are stored, means for comparing respective stored IP packets with received IP packets; and means for determining the longest match between respective stored IP packets and received IP packets.

In accordance with a further embodiment of the present invention, there is provided a method, comprising comparing received IP packets to stored IP packets to determine respective longest matches, wherein flow measurement is determined.

BRIEF DESCRIPTION OF THE DRAWINGS

The teachings of the present invention can be readily understood by considering the following detailed description in conjunction with the accompanying drawings, in which:

FIG. 2 depicts a sample two-run count table in accordance with an embodiment of the present invention.

To facilitate understanding, identical or similar reference numerals have been used, where possible, to designate identical elements that are common to the figures.

DETAILED DESCRIPTION OF THE INVENTION

Figure 1:
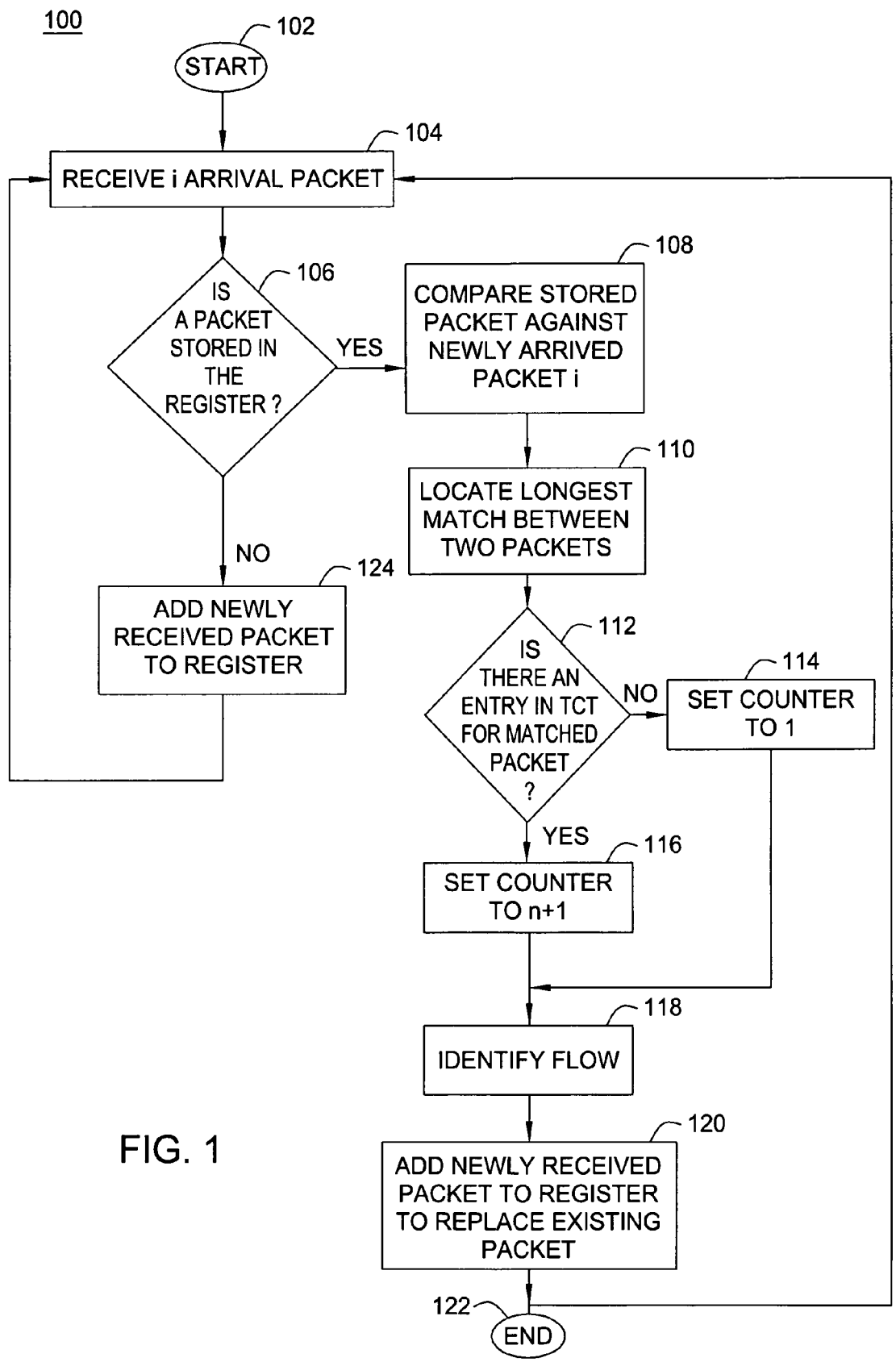
FIG. 1 depicts a flow diagram of a method in accordance with one embodiment of the present invention.

Embodiments of the present invention are directed, for example, to a method and system for assisting service providers in monitoring and measuring their networks by detecting traffic patterns and estimating flows without a priori knowledge of flow definition. Embodiments of the present invention include a method and system for supporting real-time, on-line processing of traffic patterns, which can be implemented for high-speed network links and relatively low hardware costs.

Specifically, network operators can determine the major flows that consume most of the network resources. Such flows can be arbitrarily defined. For example, the flow can be any traffic between two end-hosts, between two networks (i.e., network prefixes) or from any host to a destination. By continuously making real-time measurements, the operator is able to detect flow pattern shifts over time, increases in traffic for some flows passing through a router or network link (which helps detection and suppression of DoS attacks), and check the spreading of viruses or worms in the network (i.e., counting number of packets with identical payloads).

For example, in the case of a node, such as a router, processing arrivals from multiple flows, the node processes arrivals for multiple destination IP-addresses. Any field or combination of fields in the packet header can be defined to be a flow. It is assumed the node is processing a large number of flows at any point in time. Thus, embodiments of the present invention are directed to a traffic rate estimator, as described herein, to estimate the number of packets processed for each flow to any pre-specified level of accuracy.

Embodiments of the present invention incorporate a scheme known as Runs bAsed Traffic Estimator (RATE), an approach based on sampling two-runs of flows, and described in a technical paper, entitled *Runs bAsed Traffic Estimator (RATE): A Simple, Memory Efficient Scheme for Per-Flow Rate Estimation*, IEEE INFOCOM 2004, authored by Kodialam, Lakshman and Mohanty, the entire disclosure of which is incorporated herein by reference. RATE is one dimensional and can be applied if the combination of fields in a header that is being tracked is already known. The combination of fields defines a flow in RATE. RATE is based on sampling only a subset of the arriving traffic at the node. However, RATE does decide the subset carefully so that flows that send a larger proportion of the traffic are sampled more frequently. This is achieved by sampling two-runs.

The idea in RATE is to count the number of two-runs that a flow generates and use this value to estimate the fraction of total traffic that belongs to that flow. Because small sources have very low probability of generating two-runs, the list of flows that are detected will be quite small. This leads to a memory efficient implementation. RATE detects and measures two-runs by maintaining the following information:

Two-Run Detection Register R: This register holds one flow id, typically the last sample. If the current flow id is the same as that in the register, a two-run is detected, the Two-Run Count Table (described herein) is updated and the run detecting register R is set to null. Otherwise, the flow id in R is replaced by the current flow id.

Two-Run Count Table (TCT): The Two-Run Count Table maintains counts for the number of two-runs for each flow that has a two-run. When a two-run is detected for a particular flow and if the flow is already in the TCT, then the two-run count for the table is incremented by one. If the flow for which a two-run has been detected is not in the TCT, then this flow id is added to the TCT and its count is initialized to one.

The two-run detecting register is reset to null as soon as there are two arrivals consecutively from the same flow. Resetting the register as soon as a two-run is detected makes the point at which the two-runs occur a regeneration point. To illustrate the implication of this resetting, consider the following example:

If the sequence of flow ids is . . . 23, 46, 46, 46, 57 . . . , flow number 46 has a two-run. As soon as a two-run is detected, the two-run counter is initialized to null. Therefore, the third 46 in the sequence will not be counted as a two-run though the second and third 46 can be viewed as a two-run. If the sequence is, however . . . 23, 46, 46, 46, 46, 57 . . . , then flow 46 would have had 2 two-runs. Thus, if there are k arrivals in a row for a given flow, then the flow will have k/2 two-runs.

Embodiments of the present invention extend beyond RATE by decreasing the real-time processing time while increasing the processing requirement at the time of querying after the sampling is done. That is, in embodiments of the present invention, only the longest match between two packets is counted in order to avoid excessive memory usage while performing an analysis. Only one k-dimensional runs register R and one TCT are maintained. The system counts the runs for the longest string only. In other words, embodiments of the present invention use a packet register (or buffer) to store the last arrival packet and maintain a two-run count table for flow statistics. Each new arrival packet is compared with the last arrival in the register to find the longest match between both packets. A two-run count algorithm is used to obtain the correct two-run count for all corresponding flows.

For example, if the first two headers of a packet are (23, 12, 34, 45, 67) and (23, 12, 15, 45, 6), instead of counting this as a two-run for the seven flows that are subsets of (23, 12, X, 45, X), the system just maintains it as a two-run for (23, 12, X, 45, X), where X is defined as a "don't care" symbol. This saves both memory and processing time because the system only looks at the longest string and not every subset of it. For each flow, then, there will be an associated two-run counter.

At the end of the sampling process, if the system is given a flow equal to $(f_1, f_2, \ldots f_k)$, the following routine is used to determine the number of two-runs for that flow.

Set COUNT=0.
For each flow, G∈TCT do
If F⊃G then
COUNT=COUNT+$N_2$(G).

Where the counts for all flows are readily available, in the more efficient implementation, the count for a given flow has to be generated from the TCT. Therefore, the processing requirement at the time of querying is higher. In other words, the system decreases real-time processing and increases query time processing in order to achieve this efficiency in real-time speed, as well as memory.

For the efficient tracking of two runs in the k-dimensional case, the system maintains a k-dimensional run vector R and a corresponding k-dimensional counter C. $R^i = (r^i_1, r^i_2, \ldots r^i_k)$, and $C^i = (c^i_1, c^i_2, \ldots, c^i_k)$ to denote the run vector and the counter after arrival i. These vectors are updated as follows:

At arrival i set $$c^i_j = \{1 \text{ if } h^i_j \neq r^{i-1}_j$$

$$c^i_j = \{c^{i-1}_j + 1 \text{ if } h^i_j = r^{i-1}_j$$

$$r^i_j = h^i_j 1 \leq j \leq k.$$

Using the above updating scheme, the following example illustrates an embodiment of how the counters are used:

Example

Let $R^{i-1}$=(28, 18, 52, 16, 22) and the corresponding $C^{i-1}$= (1, 3, 3, 2, 2). Let $H^i$=(28, 34, 52, 16, 22). Then $R^i$=(28, 34, 52, 16, 22) and the corresponding $C^i$=(2, 1, 4, 3, 3). We now have to update the TCT. We ignore fields that have a run length of 1 in the analysis. Unlike the one dimensional tag of the RATE scheme, in accordance with embodiments of the present invention, the different fields might have different run lengths at any given point.

We start with the entry with the smallest run length, in this case 2. Note that (28, X, 52, 16, 22) represents the longest string (flow) that has a two-run. Consider the flow F=(X, X, X, 16, 22). Note that arrival i does not create a two-run for F because the run length for F is only 3. However, by incrementing the two-run counter for (28, X, 52, 16, 22), we have incremented the two-run count for F. This has to be corrected. More generally, whenever the count is an odd number, then there is no two-run. In order to keep the counts accurate, we decrement the TCT counter corresponding to strings with odd numbers of two-runs, in this case the string (X, X, 52, 16, 22). The net effect of this increment and decrement is that running COUNT TWO-RUNS with F will not result in an increment in the count for F. However, this will also be the case for the string (X, X, 52, X, X) which has had a 4-run. Therefore, we increment the TCT counter for (X, X, 52, X, X).

In summary, we add three flows to the TCT: (1) Increment (28, X, 52, 16, 22) by one; (2) Decrement (X, X, 52, 16, 22) by one; and (3) Increment (X, X 52, X, X) by one. This way, one can readily verify that for any flow, the net count will be correct. Such alternating increment and decrement are necessary only if there are interspersed odd and even numbers in $C^i$. In the above example, if we had $C^i$=(2, 1, 4, 6, 6), then we would only need to increment (28, X, 52, 16, 22) by one.

Embodiments of the present invention are primarily described within the context of a flow matching method using a 5-tuple packet header, a register, and a two-run table, which comprises two data structures, namely, flow identifier and a counter. However, those skilled in the art and informed by the teachings herein will realize that the present invention is also applicable to other flow identifying methods and systems using other means.

In one embodiment, there is provided a measurement mechanism that detects and estimates flows whose size is above a pre-specified accuracy level. The definition of flow is not known a priori, except that it is defined based on some combination of the 5-tuple in an IP packet header: source address (including prefix), source port, destination address (including prefix), destination port and protocol id.

FIG. 1 is a flow diagram depicting an exemplary embodiment of a method 100 for generating real-time detection and identification of traffic patterns in core networks with high-speed links carrying large numbers of flows. This method assumes a computer architecture (described more fully in connection with FIG. 3 herein below) having a register that can store a packet, and a two-run table (TCT), i.e., data structure instrument, in a fast memory. The TCT is the longest match, TCT and contains the flow identifier and the counter. These are the two main data structures.

The method 100 begins at step 102. At step 104, an i arrival packet is received for processing. At step 106, the packet is compared to what has been stored in a register to see whether or not another packet has been stored in that register. If a packet has been stored in the register, then the method continues to step 108. At step 108, the newly received packet is compared to the stored packet in the register. Through this comparison, at step 110, the longest match between the two packets is located.

The comparison in step 108 is performed, for example, by comparing at least one of the fields of the 5-tuple packet header and determining how many of these fields match within the two packets. So, if one is looking at the 5-tuple, for example, then, one compares as many fields as necessary among the 5-tuples between the packet stored in the register and the new arrival packet. Then, one finds all the matched fields. After the longest match between two packets is determined, at step 112, the method continues by determining whether there is an entry in the TCT for the matched packet or flow.

If there is no existing entry in the TCT for the matched packet, then the counter is set to one at step 114. If there is an existing entry in the TCT for the matched packet, then increase the counter to one. This is added to the current count in the counter at step 116 to increase the counter. For example, if the count is an integer n, where n is greater than or equal to one, then the new counter number is n+1. At step 118, the flow is identified. At step 120, once the user updates the TCT, the newly received two-run packet is added into the register to replace the existing packet. The process then repeats back to step 104 to receive another packet. If no further packets exist, the process ends at step 122.

If the received packet at step 104 is the first packet received using the analysis at step 106, then at step 124, the newly received packet is added to the register. The process then continues back to step 104, where the next received arrival packet is analyzed as discussed above.

FIG. 2 is a table depicting a two-run table (TCT) 200. The TCT 200 includes a column 202 of rows of 5-tuple of IP headers and a column 204 of count values. The 5-tuple designations include source IP 206, source Port 208, destination IP 210, destination Port 212 and protocol number 214. The rows in both the 5-tuple column 202 and the count column 204 are populated using the scheme described herein above.

Embodiments of the present invention contemplate a node in a network processing arrivals from multiple flows. An example is a router processing arrivals for multiple destination IP addresses. Any field or combination of fields in the packet header can be defined to be a flow. The node is assumed to be processing a large number of flows at any point in time.

In accordance with another embodiment of the present invention, there is provided a method for detecting hidden traffic patterns, including finding the longest match between two consecutive packets. Specifically, the approach uses a packet register (or buffer) to store the last arrival packet and maintain a two-run count table (TCT). This novel approach can automatically detect all flows whose rate is above a given threshold without knowing flow dimension a priori. The approach is efficient in terms of accuracy, estimation time, memory, cost, and operational overhead for each packet arrival. The minimum estimation time is a function of the specified accuracy level.

Figure 3:
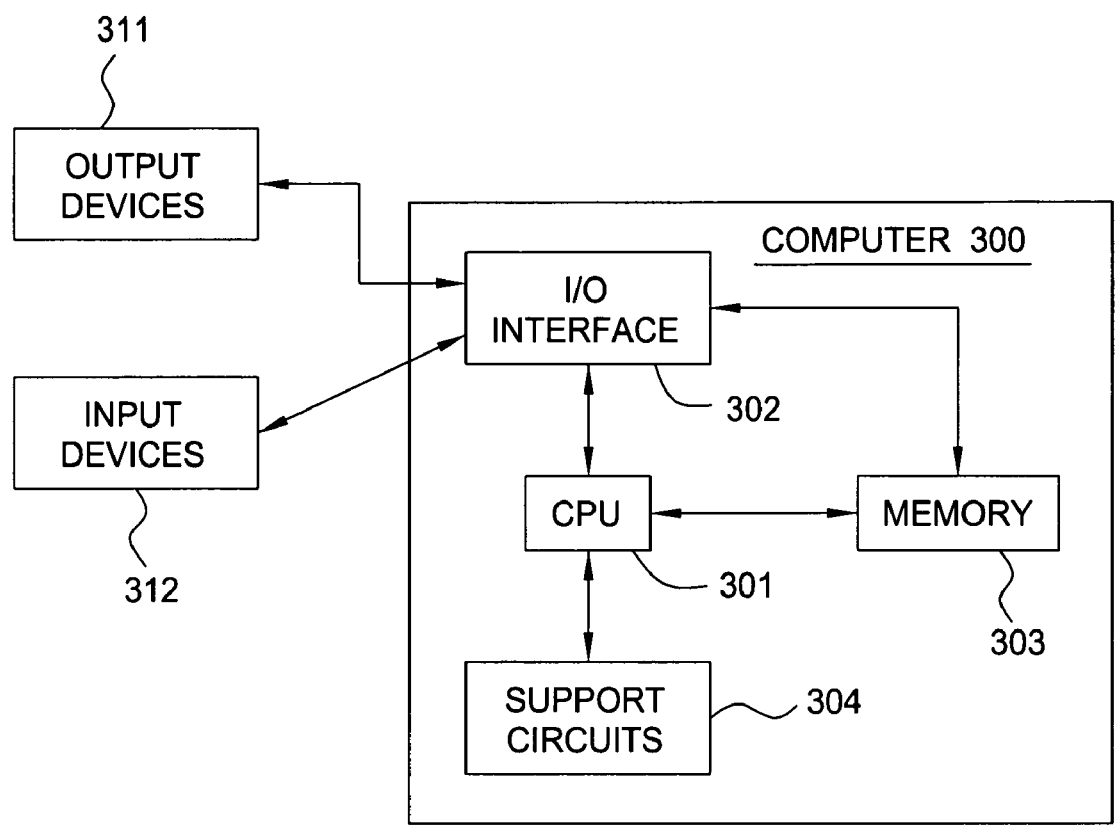
FIG. 3 depicts a block diagram depicting an exemplary embodiment of a computer suitable for implementing the processes and methods described herein.

FIG. 3 is a block diagram depicting an exemplary embodiment of a computer 300 suitable for implementing the processes and methods described herein. For example, the computer 300 may be used to implement the flow detection and identification as described herein and with respect to the method depicted in FIG. 1. The computer 300 includes a central processing unit (CPU) 301, a memory 303, various support circuits 304, and an I/O interface 302.

The CPU 301 may be any type of microprocessor known in the art. The support circuits 304 for the CPU 301 include conventional cache, power supplies, clock circuits, data registers for storing IP packets, I/O interfaces, and the like. The I/O interface 302 may be directly coupled to the memory 303, or coupled through the CPU 301. The I/O interface 302 may be coupled to various input devices 312, and output devices 311, such as a conventional keyboard, mouse, printer, display, and the like. The memory 303 may contain a two-run count table (TCT), i.e., data structure instrument. The TCT contains the flow identifier and the count data structures.

The memory 303 may also store all or portions of one or more programs and/or data to implement the processes and methods described herein. Although one or more embodiments of the present invention are disclosed as being implemented as a computer executing on a software program, those skilled in the art will appreciate the present invention may be implemented in hardware, software, or a combination of hardware and software. Such implementations may include a number of processors independently executing various programs and dedicated hardware, such as ASICs.

The computer 300 may be programmed with an operating system, which may be OS/2, Java Virtual Machine, Linux, Solaris, Unix, Windows 95, Windows 98, Windows NT, and Windows 2000, Windows ME, and Windows XP, among other known platforms. At least a portion of an operating system may be disposed in the memory 303. The memory 303 may include one or more of the following: random access memory; read-only memory; magneto-resistive read/write memory; optical read/write memory; cache memory; magnetic read/write memory; and the like.

An embodiment of the present invention is implemented as a program product for use with a computer system. Program (s) of the program product-defines functions of embodiments and can be contained on a variety of media, which include, but are not limited to: (i) information permanently stored on non-writable storage media (e.g., read-only memory devices within a computer, such as CD-ROM or DVD-ROM, disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communication medium, such as through a computer or telephone network, including wireless communications. The latter embodiment specifically includes information downloaded from the Internet and other networks. Such signal-bearing media, when carrying computer-readable instructions that direct functions of the present invention, represent embodiments of the present invention.

Thus, embodiments of the present invention described herein have several advantages. For example, the methods and systems can measure flow rates with any desired level of accuracy. In addition, the methods and systems provide for a flexible approach to detecting and monitoring flow. Specifically, the approaches discussed herein do not require a priori knowledge of flow definitions. The user only needs to specify the set of fields in an IP packet, for instance, that may potentially be used to define a flow and the approach will estimate any significant flows specified by any possible combinations of such fields. Another advantage is that the detection of traffic patterns can be performed in real-time and on-line. That is, the processing is simple and fast enough for on-line operations and can handle relatively high link speeds in the core of service provider networks. The measurement time required for deriving rate estimates is also relatively short. As another advantage, the methods and systems can be implemented with low hardware costs.

While the foregoing is directed to various embodiments of the present invention, other and further embodiments of the present invention may be devised without departing from the basic scope thereof. As such, the appropriate scope of the present invention is to be determined according to the claims, which follow.

What is claimed is:

1. A method for measuring flow at a node, the method comprising:
receiving an IP packet at the node;
determining if another IP packet is stored in a register of the node;
if another IP packet is stored in the register, comparing a plurality of fields of the stored IP packet with a corresponding plurality of fields of the received IP packet; and
determining a longest match between the stored IP packet and the received IP packet, wherein the longest match comprises a set of values for which a maximum number of the compared fields of the stored and received IP packets have matching values, wherein the set of values of the longest match has associated therewith a set of fields of the longest match, wherein the set of fields of the longest match includes each of the compared fields of the stored and received IP packets associated with the set of values of the longest match, wherein the set of fields of the longest match is not known a priori; and
updating a table stored on the node using the determined longest match.

2. The method of claim 1, wherein the table is a two-run table, wherein updating the two-run table comprises:
reviewing the two-run table to determine if an entry is stored therein that matches the determined longest match.

3. The method of claim 2, wherein the two-run table comprises a relational database including a 5-tuple data field and a counter data field.

4. The method of claim 3, wherein:
if no entry stored in the two-run table matches the determined longest match, setting a counter value to an integer n, where $n \geq 0$; and
if an entry stored in the two-run table matches the determined longest match, setting the counter value to n+1.

5. The method of claim 4, further comprising adding the received IP packet to the register to replace the stored IP packet.

6. The method of claim 3, wherein the step of comparing comprises comparing the 5-tuple fields of a header of the received IP packet with the 5-tuple fields of a header of the stored IP packet.

7. A non-transitory computer readable storage medium having stored thereon instructions that, when executed by a processor, cause the processor to perform a method for determining a flow measurement, the method comprising:
receiving an IP packet;
determining if another IP packet is stored in memory;
if another IP packet is stored in memory, comparing a plurality of fields of the stored IP packet with a corresponding plurality of fields of the received IP packet;
determining a longest match between the stored IP packet and the received IP packet, wherein the longest match comprises a set of values for which a maximum number of the compared fields of the stored and received IP packets have matching values, wherein the set of values of the longest match has associated therewith a set of fields of the longest match, wherein the set of fields of the longest match includes fields of the stored and received IP packets associated with the set of values of the longest match, wherein the set of fields of the longest match is not known a priori; and
updating a table using the determined longest match.

8. The non-transitory computer readable storage medium of claim 7, wherein the table is a two-run table, wherein updating the table further comprises reviewing the two-run table to determine if an entry is stored therein that matches the determined longest match.

9. The non-transitory computer readable storage medium of claim 8, wherein the two-run table comprises a relational database including a 5-tuple data field and a counter data field.

10. The non-transitory computer readable storage medium of claim 9, wherein:
   if no entry stored in the two-run table matches the determined longest match, setting
   a counter value to an initialized value; and
   if an entry stored in the two-run table matches the determined longest match, setting the counter value to another value.

11. The non-transitory computer readable storage medium of claim 10, further comprising adding the received IP packet to memory to replace the stored IP packet.

12. The non-transitory computer readable storage medium of claim 7, wherein the step of comparing comprises comparing the 5-tuple fields of a header of the received IP packet with the 5-tuple fields of a header of the stored IP packet.

13. An apparatus for measuring flow, comprising:
   a processor configured for:
      receiving an IP packet;
      determining if another IP packet is stored in memory;
      if another IP packet is stored in memory, comparing a plurality of fields of the stored IP packet with a corresponding plurality of fields of the received IP packet;
      determining a longest match between the stored IP packet and the received IP packet, wherein the longest match comprises a set of values for which a maximum number of the compared fields of the stored and received IP packets have matching values, wherein the set of values of the longest match has associated therewith a set of fields of the longest match, wherein the set of fields of the longest match includes fields of the stored and received IP packets associated with the set of values of the longest match, wherein the set of fields of the longest match is not known a priori; and
      updating a table using the determined longest match.

14. The apparatus of claim 13, wherein the table is a two-run table, and wherein the processor is configured for:
   reviewing the two-run table to determine if an entry is stored therein that matches the determined longest match.

15. The apparatus of claim 14, wherein the two-run table comprises a relational database including a 5-tuple data field and a counter data field.

16. The apparatus of claim 15, wherein the processor is configured for:
   setting a counter value to an integer n, where $n \geq 0$, if no stored entry in the two-run table matches the determined longest match; and
   setting the counter value to n+1 if an entry stored in the two-run table matches the determined longest match.

17. The apparatus of claim 16, wherein the processor is configured for:
   adding the received IP packet to memory to replace the stored IP packet.

18. The apparatus of claim 13, wherein comparing comprises comparing 5-tuple fields of a header of the received IP packet with 5-tuple fields of a header of the stored IP packet.

19. A method for measuring flow at a node, the method comprising:
   comparing, at the node, a plurality of fields of a first packet to a corresponding plurality of fields of a second packet to determine a longest match between the first and second packets, wherein the longest match comprises a set of values for which a maximum number of the compared fields of the first and second packets have matching values, wherein the set of values of the longest match has associated therewith a set of fields of the longest match, wherein the set of fields of the longest match includes fields of the first and second packets associated with the set of values of the longest match, wherein the set of fields of the longest match is not known prior to comparison of the first and second packets; and
   updating a table stored on the node using the determined longest match.

20. The method of claim 19, wherein the step of determining the longest match comprises comparing 5-tuple fields of the first and second packets.

* * * * *